(12) United States Patent
Masson et al.

(10) Patent No.: US 6,786,748 B2
(45) Date of Patent: Sep. 7, 2004

(54) SWITCH IN SMART CARD CONNECTOR

(75) Inventors: Olivier Masson, Dole (FR); Michael Cour, Sampaus (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/446,067

(22) Filed: May 27, 2003

(65) Prior Publication Data

US 2004/0023538 A1 Feb. 5, 2004

(30) Foreign Application Priority Data

May 28, 2002 (FR) .............................................. 02 06473

(51) Int. Cl.⁷ .............................................. H01R 29/00
(52) U.S. Cl. ..................................................... 439/188
(58) Field of Search .............................. 439/188, 489, 439/630

(56) References Cited

U.S. PATENT DOCUMENTS

| | | | |
|---|---|---|---|
| 6,099,337 A | | 8/2000 | Chan |
| 6,135,809 A | * | 10/2000 | Asakawa ..................... 439/489 |
| 6,305,960 B1 | | 10/2001 | Fan |
| 6,326,568 B2 | * | 12/2001 | Martucci et al. ............ 200/283 |
| 6,358,074 B2 | * | 3/2002 | Bricaud et al. ............. 439/188 |
| 6,435,887 B2 | * | 8/2002 | Koitsalu ..................... 439/188 |
| 6,485,319 B2 | * | 11/2002 | Bricaud et al. ............. 439/188 |
| 6,488,528 B2 | * | 12/2002 | Nishioka .................... 439/489 |
| 6,602,096 B1 | * | 8/2003 | Kronestedt et al. ......... 439/630 |

FOREIGN PATENT DOCUMENTS

| | | |
|---|---|---|
| DE | 9407486 U1 | 10/1995 |
| FR | A-2796763 | 1/2001 |

* cited by examiner

*Primary Examiner*—Gary Paumen
(74) *Attorney, Agent, or Firm*—Roger C. Turner

(57) ABSTRACT

A smart card connector switch that detects full installation of a smart card, includes first and second switch contacts (42, 40), with the second switch contact including a sheet metal switch blade (41) that can be depressed against the first contact. The second switch contact includes a polymer depressable element (60) mounted on the switch blade and having a rounded top (62) lying higher than the switch blade so a card engages and depresses the depressable element as the card approaches its fully installed position.

12 Claims, 4 Drawing Sheets

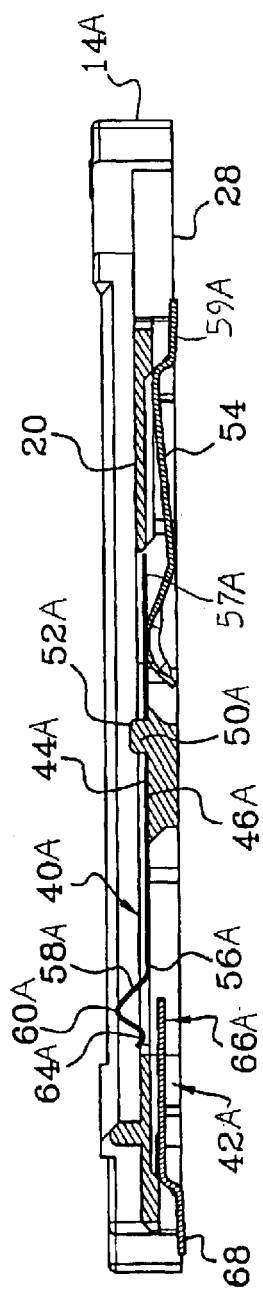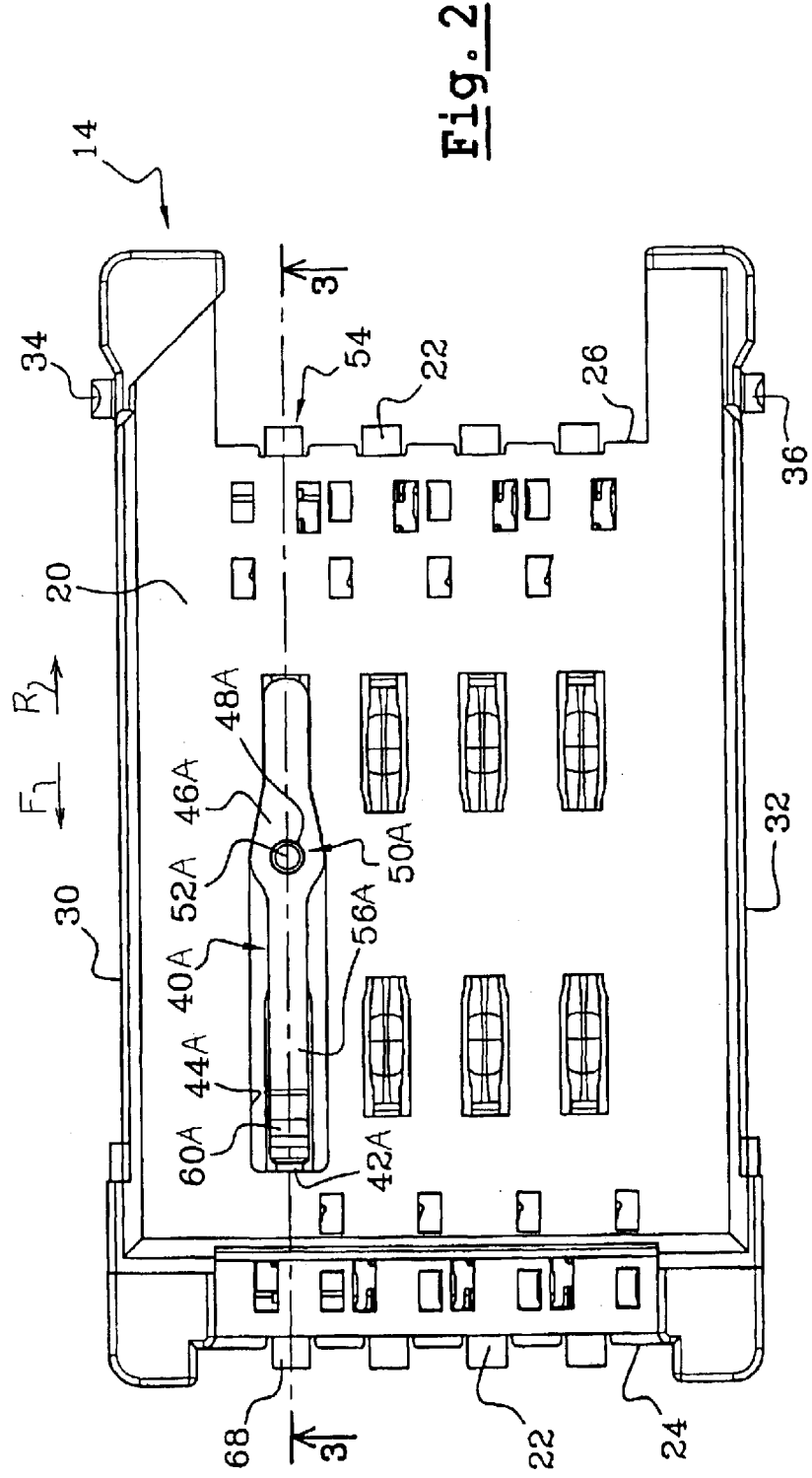
Fig. 3
Fig. 2

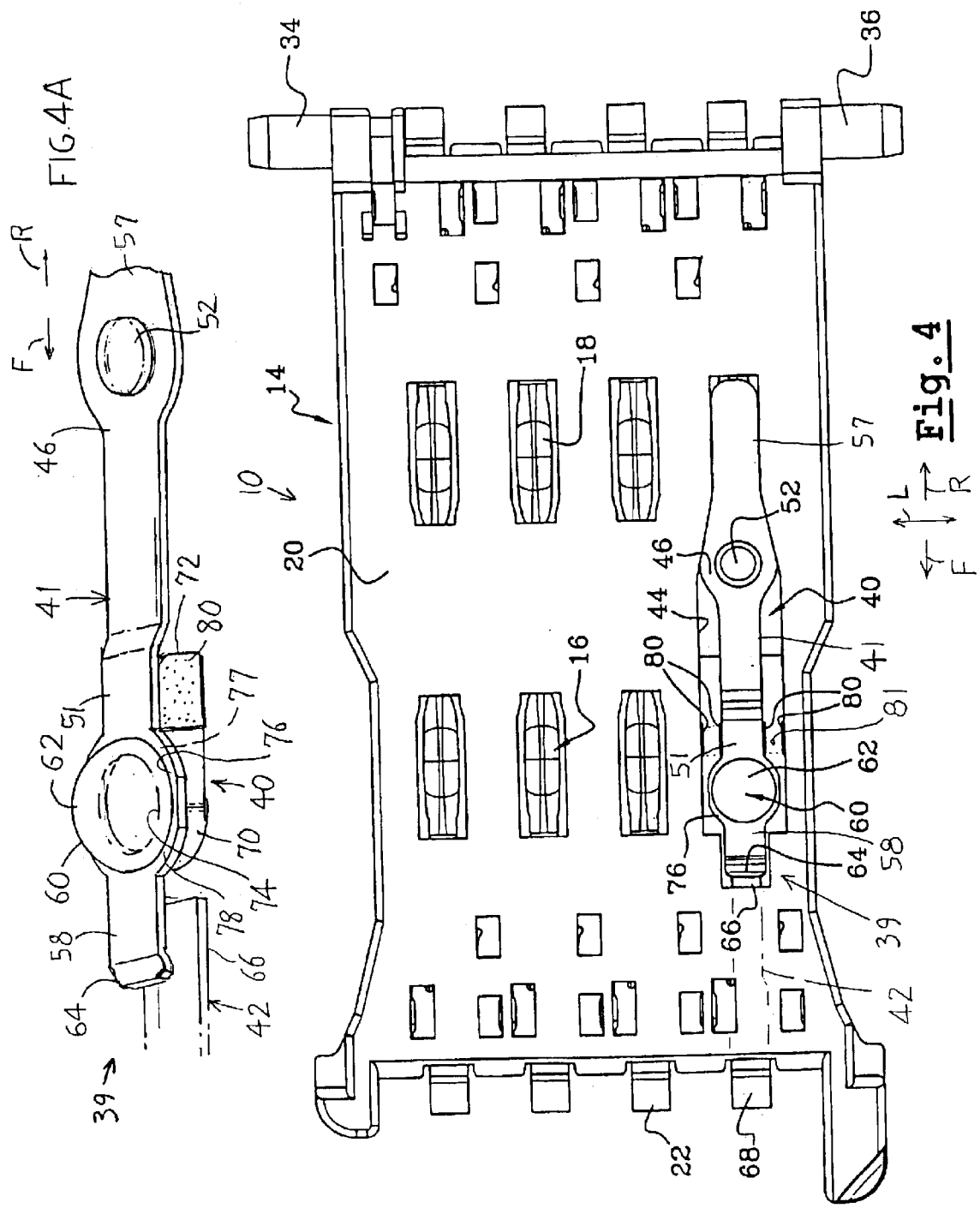

SWITCH IN SMART CARD CONNECTOR

CROSS-REFERENCE

Applicant claims priority from French patent application 0206473 filed May 28, 2002.

BACKGROUND OF THE INVENTION

A smart card, which may have about the same dimensions as a credit card, has one or more embedded integrated circuits, and has an active face with a plurality of contact pads that connect to the integrated circuit. A common arrangement includes six pads arranged in three columns and two rows. An electrical connector for connecting read/write circuitry to the card may include an insulative base with a card-receiving upper face, and with the contacts having pad-engaging ends projecting above the upper face, to be depressed by the pads of the smart card.

A card may be installed on the base in a number of ways, as by sliding it along the upper face or mounting it on a cover that pivots down the card until it lies facewise adjacent to the base upper face. Many card connectors include an electrical switch for detecting the presence of a card as it approaches the fully inserted position. Such a switch can make or break a switching circuit.

A switching circuit for detecting a smart card approaching a fully inserted position, can include a sheet metal switch blade that is depressed by the card so the blade engages another contact. Some problems that can arise with such a switch are that the card may become scratched by the portion of a sheet metal blade that the card engages, since the card is usually of plastic at its outside surface except at its metal contact pads. Also, there is a risk that the switch blade will engage one of the card contact pads and possibly pass a damaging current to it. A switch with a pair of switch contacts, wherein one of the switch contacts engages a card to detect the card approaching a full insertion position, which avoided the above disadvantages, would be of value.

SUMMARY OF THE INVENTION

In accordance with one embodiment of the present invention, a smart card connector is provided, with an electrical switch that detects a smart card close to its fully inserted position, while avoiding scratching of the card or the inadvertent connection of unwanted currents to contact pads of the card. The connector is of the type that includes an insulative base with an upper card-receiving surface and contacts with pad-engaging portions projecting above the surface to engage pads of a smart card that lies facewise adjacent to the base card-engaging surface. A switch for detecting a card near its fully installed position includes first and second switch contacts mounted on the base. The second switch contact includes a sheet metal switch blade that can be depressed by a card so the switch blade moves against the first contact or moves out of engagement with the first contact. A depressable element of insulating material is mounted on the blade, the depressable element having a top lying above the blade. As a result, a card near the fully installed position engages only the top of the depressable element to depress the contacting part of the second switch contact.

The depressable element is preferably formed of a polymer and has a rounded top, the polymer having a hardness no more than one fifth that of the metal of the switch blade. As a result, the depressing element, which is the only part engaged by a card, is unlikely to scratch the card, and cannot conduct electricity to a contact pad that happens to engage the element.

The switch blade has a blade hole, and the depressable element is trapped to walls of the blade hole by lying closely above and below the walls of the blade hole. This can be accomplished by projecting a stub upward through the blade hole and deforming the top of the stub to trap it to the blade while forming a rounded top on the stub.

The novel features of the invention are set forth with particularity in the appended claims. The invention will be best understood from the following description when used in conjunction with the accompanying drawings.

BRIEF DESCRIPTION OF THE DRAWINGS

FIG. 2 is a plan view of the connector of FIG. 1, without the cover.

FIG. 3 is a sectional view taken on line 3—3 of FIG. 2, without the cover.

FIG. 4 is a plan view of a smart card connector of the present invention, without the cover or card in place.

FIG. 4A is a partial isometric view of the connector of FIG. 4, showing a portion of the card-detecting switch.

DESCRIPTION OF THE PREFERRED EMBODIMENTS

Figure 1:
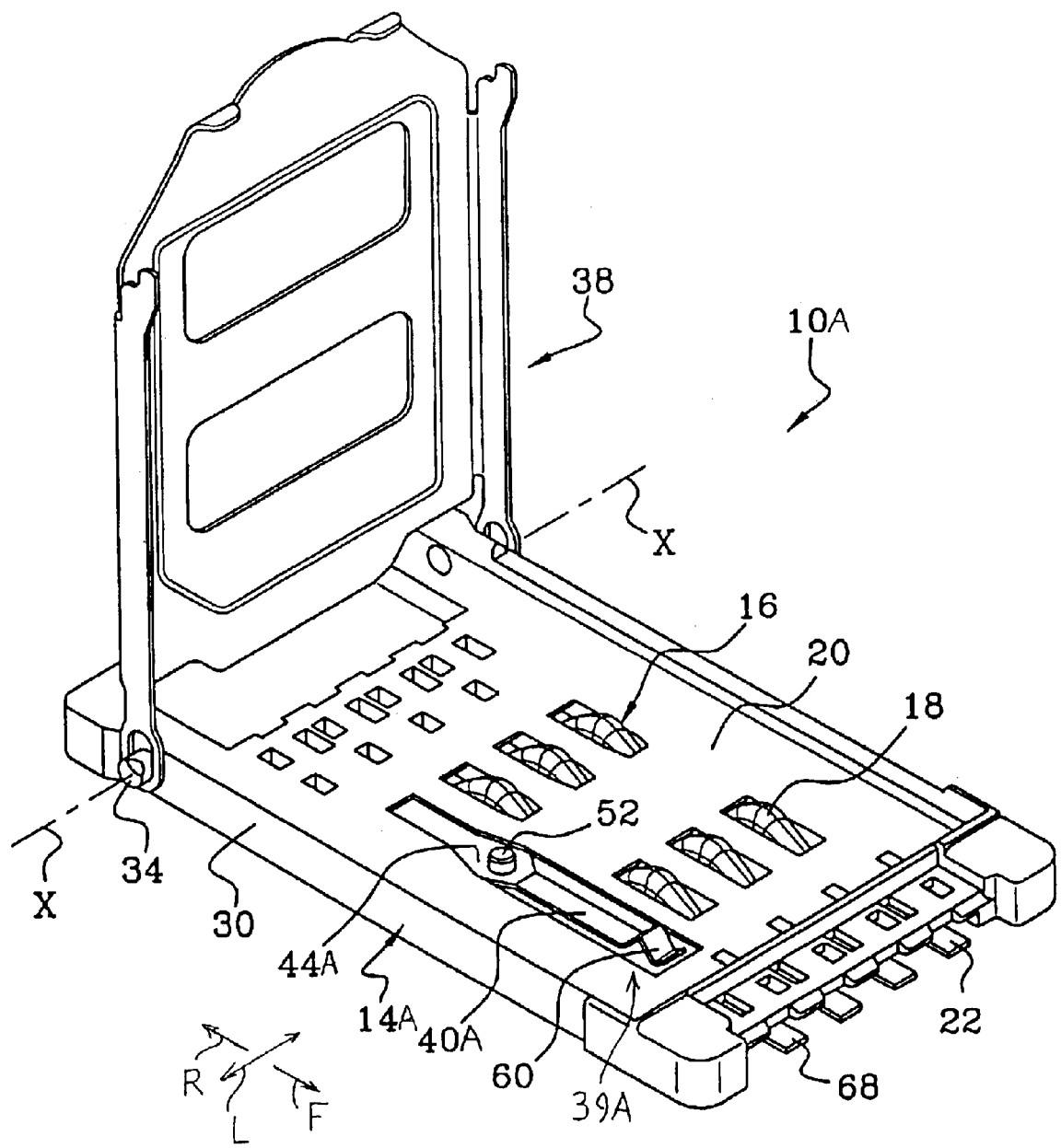
FIG. 1 is an isometric view of an earlier smart card connector that applicant designed, with a cover in a fully open position.

FIG. 1 illustrates a smart card connector 10A of applicant's earlier design, which includes a base 14A of insulative material. The base has a card-receiving upper surface 20 against which a smart card can be laid, so the card pads engage pad-engaging portions 18 of pad-engaging contacts 16. The pad-engaging contacts have tails 22 that can be soldered to a circuit board on which the connector lies. A cover 38 that is pivotally mounted on a pin 34 that is fastened to the base, can pivot about a laterally L extending axis X—X. A smart card can be installed on the cover and the cover pivoted down close to the card-receiving face or surface 20 of the base. Applicant notes that in many cases a fully installed card, which lies facewise adjacent to the card-receiving surface, is slightly spaced (usually by no more than one mm) from the card-engaging surface.

The connector includes an electrical switch 39A for detecting the presence of a smart card in its fully installed position, or in a position close to the fully installed position. The switch includes a switch blade 40A with a rear section 44A that is mounted on the base, and a front section 58A (FIG. 3) that can be depressed against another contact 42A which has a tail 68. A head 52A of the base mounts the blade rear section 44A to the base.

As shown in FIGS. 2 and 3, the second contact front section 58A of the switch blade 40A, is bent and forms a top edge 60A that lies above the rest of the switch blade. When a card presses close to the card-receiving surface 20 of the base, the card depresses the top edge 60A, causing a contacting part 64A of the second contact to move down against a contacting part 66A of the first switch contact 42A. A rear extension 57A of the contact blade engages a connecting blade 54 that has a tail 59A that can be soldered to a trace on a circuit board.

FIG. 4 illustrates a portion of a smart card connector 10 of the present invention. Substantially, the only difference is in the electrical switch 39 that detects a smart card close to its fully installed position. The switch includes second and first contacts 40, 42 which are engaged to complete an electrical circuit when a smart. card is installed. The second contact includes a switch blade 41 that has front and rear sections 58, 46 and a middle section 51 between them. The rear section 46 is fixed in place by a stub portion 52 of the base, and the switch blade has a rear extension 57.

As shown in FIG. 4A, the second contact 40 includes a depressable element 60 mounted on the middle section 51 of the sheet metal switch blade 41. The depressable element 60 is formed of insulative material. As a result, even if a contact pad of a smart card comes in contact with the element 60, current cannot pass between them. The switch blade 41 has a through blade hole 74, and the element 60 extends through the blade hole and presses firmly against top and bottom surfaces of the blade middle section that lie immediately around the blade hole. The element 60 is part of a stub 70. The stub part initially had about the same diameter as the blade hole 74 and was inserted upwardly through the blade hole. The stub part then was deformed to lock it to the walls of the blade hole in the manner that is shown. During deformation of the stub upper portion, an element top 62 is formed that is rounded, and preferably that is part of a sphere.

The fact that the element 60 was deformed is demonstrated by primarily the rim of the element pressing against the switch blade. The depressable element 60 is formed of a polymer having a hardness that is less than one fifth the hardness and preferably less than one-tenth, of the metal of the sheet metal switchblade 41 as measured by their Young's modules of elasticity. As a result of the low hardness and rounded top, the depressable element is unlikely to scratch the plastic smart card portion that normally engages the switch.

Figure 5:
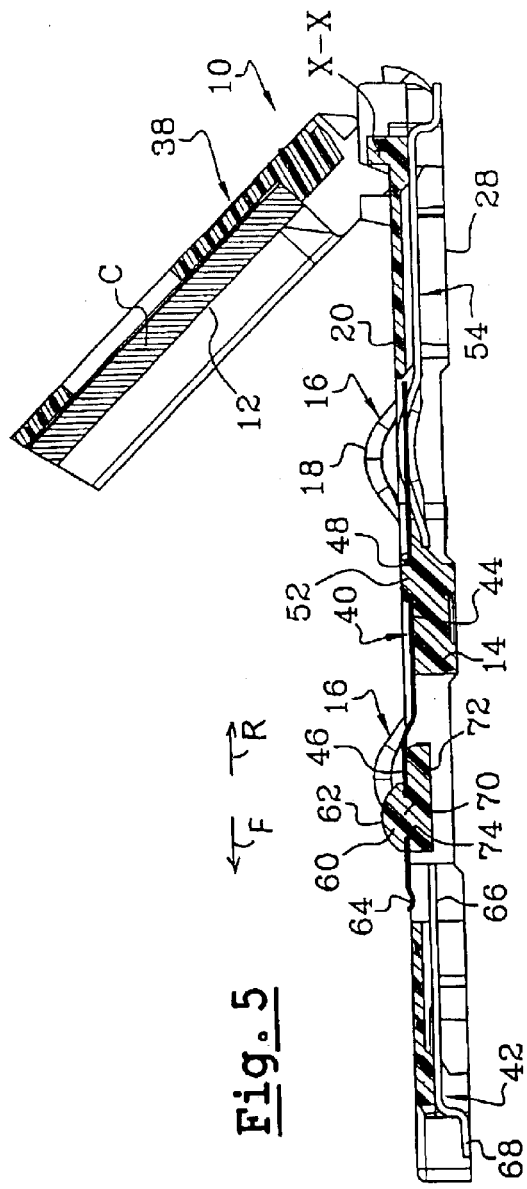
FIG. 5 is a sectional view of the connector of FIG. 4, with only a portion of the cover and card shown and with the cover in an open position.
Figure 6:
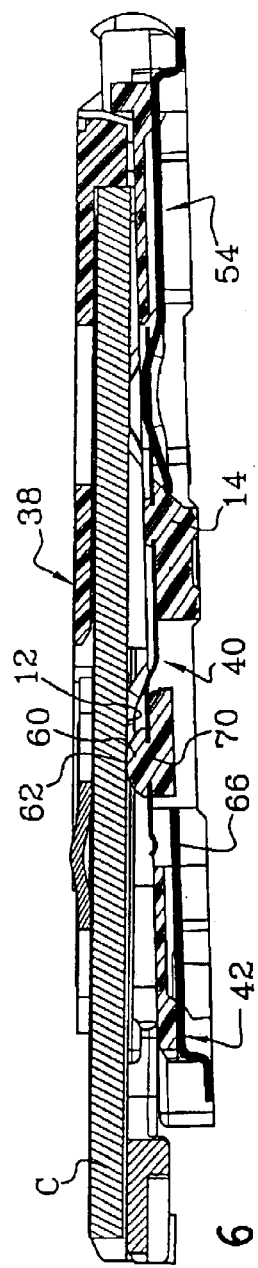
FIG. 6 is a view similar to FIG. 5, but with the cover and card therein approaching a fully installed position.

FIG. 5 illustrates the connector 10 with the smart card C lying in grooves at opposite sides of the cover 38, but with the cover in an open position. FIG. 6 illustrates the connector, wherein the cover 38 has been pivoted down so the card C is closer to its fully installed position. The card has engaged the top 62 of the depressable element, but has not yet depressed it.

Figure 7:
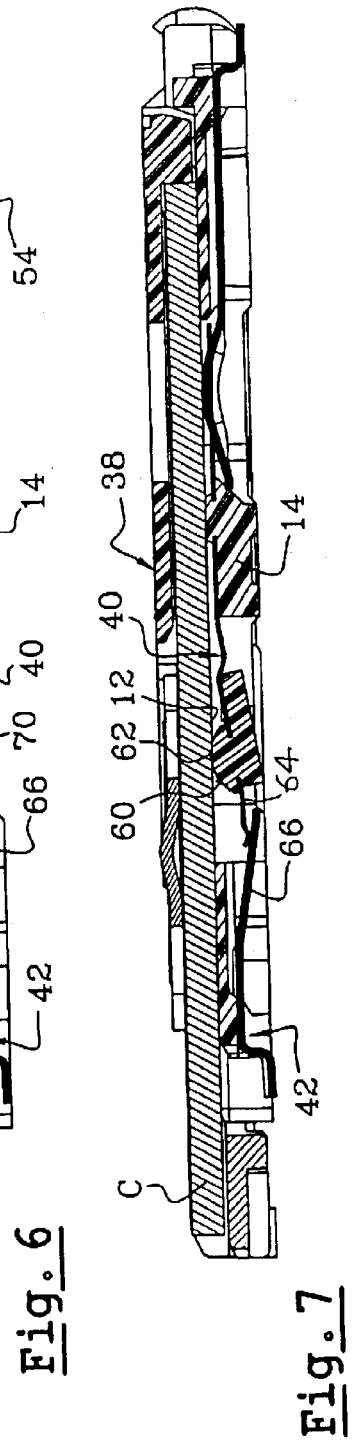
FIG. 7 is a view similar to that of FIG. 6, but with the cover fully closed and the card in a fully installed position.

FIG. 7 illustrates the cover in its fully downward position and with the card C in its fully installed position. The card has depressed the depressable member 60 so the contact part 64 of the switch blade has engaged the rear part 66 of the first contact 42. The contact part 64 has bent upward. The first contact is in the form of a resilient metal strip, and it bends.

FIG. 4 shows that the switchblade 41 lies within a recess 44 in the card-engaging face 20. FIG. 4A shows that the wall 78 immediately around the blade hole 74 has a greater width than that of the top of the depressing element 60, the width being greater than the width of the front and middle sections of the blade. The lateral width of wall 78 is limited by flat spots, to fit into the base recess 44.

Although it is possible for the stub 70 of FIG. 5 to be formed as a separate element installed on the blade, applicant prefers to initially form the stub 70 as part of a body 72 that is molded to be integral with the base 14, and which is connected by beams with parts 80 (FIG. 4), to the rest of the base. After an upward projection on the stud is deformed to form the rounded top 62 and thereby lock the depressing element to the middle section of the switch blade, a connecting beam, indicated at 81, is removed, as with a cutter or laser, to leave the stud and depressable element free to deflect downwardly.

While terms such as "top," "downwardly," etc. have been used to describe and claim the connector and switch as it is illustrated in the drawings, it should be understood that the connector and its parts can be used in any orientation with respect to the Earth.

Thus, the invention provides a smart card connector with an electrical switch that switches (closes or opens) when a smart card approaches a position of full installation. The switch includes first and second contacts, the second contact comprising a resilient metal blade with a rear section that is fixed to a base of the connector and with front and middle sections forming a cantilevered beam. A depressing element on the cantilevered beam comprises a stud of polymer material with a rounded top lying higher than any part of the switch blade, and preferably formed by a polymer having a hardness less than one-fifth the hardness of the material of the metal switch blade. The switch blade has a widened portion with a blade hole, and the depressing element is trapped in the blade hole by portions of the depressing element lying against top and bottom surfaces of walls lying immediately around the blade hole. This is preferably accomplished by projecting a stud upward through the hole and deforming the top of the stud to form a rounded, and preferably part spherical, top of the depressing element. The depressing element can be initially part of the base; the element is locked to the switch blade, and connecting sections of the base can be removed to allow the cantilevered beam to readily bend.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A smart card connector that has an insulative base with front and rear portions and laterally-spaced opposite sides and an upper card-receiving surface, the connector having a plurality of pad-engaging contacts mounted on the base, the contacts having pad-engaging portions projecting above said card-receiving surface for engaging contact pads on a lower face of a smart card that lies in an installed position wherein a face of the smart card lies facewise adjacent to said card-receiving surface, the connector including an electrical switch for detecting the presence of a smart card in said installed position, said switch including first and second switch contacts mounted on said base, said second switch contact having a contacting part and said second switch contact being resiliently depressable to change its contact condition between not contacting and contacting said first contact, wherein:

said second switch contact includes a sheet metal switch blade and a depressable element of insulating material mounted on said blade, said depressable element having a top lying above all of said blade so a card in said installed position depresses said top of said depressable element to depress said contacting part of said second switch contact.

2. The connector described in claim 1 wherein:

said switch blade forms said contacting part of said second contact, said contacting part lies in a resiliently bendable front section of said blade, said blade has a rear section lying opposite said front section with said rear section being fixed to said base, and said blade has a middle section lying between said rear and front sections;

said depressable element lies on said middle section of said blade, whereby to enable said depressable element top to be depressed far while said contacting part is not depressed much further because of upward bending of said front section.

3. The connector described in claim 1 wherein:

said blade has a through hole;

said depressable element is trapped to walls of said blade hole, with portions of said depressable element that lie against top and bottom surfaces of said walls of said blade hole having a greater width than a width of said blade hole, to thereby lock said depressable element to said blade.

4. The connector described in claim 3 wherein:

said depressable element has an upper portion that has been deformed so a lower part thereof lies against a surface of said blade, with said deformation forming a rounded top of said depressable element.

5. The connector described in claim 1 wherein:

said depressable element top is in the form of a spherical cap.

6. The connector described in claim 1 wherein:

said blade has a rear section with a rear through hole;

said base has an integral stud that projects upward through said rear through hole, and with an upper end of said stud being deformed flush with said base card-receiving surface and against an upper surface of said blade rear section to lock said blade rear section to said base and form said depressable element.

7. The connector described in claim 1 wherein:

said depressable element is a part that has been initially molded integrally with said base and then attached to said second blade, and which thereafter has been severed from said base.

8. The connector described in claim 1 wherein:

said depressable element is formed of a polymer having a hardness less than one-fifth the hardness of the metal of said sheet metal switch blade.

9. A smart card connector that has an insulative base with front and rear portions and laterally spaced opposite sides and an upwardly facing card-receiving surface, the connector having a plurality of pad-engaging contacts with pad-engaging portions projecting above said card receiving surface, and the connector having an electrical switch for detecting a smart card in a fully installed position wherein a face of the smart card lies facewise adjacent to said card-receiving surface, wherein:

said switch includes first and second switch contacts, said second switch contact including a resilient metal blade with a rear section fixed to said base and a front section lying in vertical alignment with said first contact to make and break engagement with said first contact as said front section moves down and up;

a depressable element fixed to a section of said blade, said depressable element being formed of a polymer material having a hardness no more than one-fifth the hardness of the material of said blade, said depressable element having a top that is rounded and that lies higher above said card-receiving surface that any part of said blade, so the only part of said second contact engaged by a fully installed card is said top of said depressable element.

10. The connector described in claim 9 wherein:

said section of said blade to which said depressable element is fixed, has top and bottom surfaces and a hole extending between said surfaces, and said depressable element has top and bottom portions that press against said top and bottom surface so said depressable element is locked to said blade.

11. The connector described in claim 9 wherein:

said depressable element is a part that has been initially molded integrally with said base and then attached to said second blade and which thereafter has been cut from said base.

12. The connector described in claim 9 wherein:

said section of said blade to which said depressable element is fixed has a greater lateral width than sections of said blade immediately forward and rearward of said section to which said depressable element is fixed, whereby to provide room for mounting said depressable element.

* * * * *